United States Patent
Larsen et al.

(10) Patent No.: US 8,730,166 B2
(45) Date of Patent: May 20, 2014

(54) MULTI-SENSORED CONTROL STICK FOR ENHANCED INPUT SENSITIVITY AND FUNTIONALITY

(75) Inventors: Eric J. Larsen, Pacifica, CA (US); Richard Lee Marks, Pleasanton, CA (US); Anton Mikhailov, Campbell, CA (US)

(73) Assignee: Sony Computer Entertainment, Inc., Tokyo (JP)

( * ) Notice: Subject to any disclaimer, the term of this patent is extended or adjusted under 35 U.S.C. 154(b) by 211 days.

(21) Appl. No.: 13/278,083

(22) Filed: Oct. 20, 2011

(65) Prior Publication Data

US 2013/0100021 A1   Apr. 25, 2013

(51) Int. Cl.
 *G06F 3/033* (2013.01)
(52) U.S. Cl.
 USPC ............... 345/161; 345/157; 463/37; 463/38
(58) Field of Classification Search
 USPC ............... 345/156, 157, 161; 463/36–38
 See application file for complete search history.

(56) References Cited

U.S. PATENT DOCUMENTS

| | | | | |
|---|---|---|---|---|
| 4,747,313 A * | 5/1988 | Okada | | 73/862.043 |
| 6,204,838 B1 * | 3/2001 | Wang et al. | | 345/161 |
| 7,109,994 B2 * | 9/2006 | Bollo et al. | | 345/473 |
| 2004/0011154 A1 * | 1/2004 | Dybro | | 74/473.3 |
| 2005/0176504 A1 * | 8/2005 | Stanley | | 463/37 |
| 2008/0070639 A1 * | 3/2008 | Goris et al. | | 455/566 |

* cited by examiner

*Primary Examiner* — Koosha Sharifi-Tafreshi
(74) *Attorney, Agent, or Firm* — Blakely, Sokoloff, Taylor & Zafman LLP

(57) ABSTRACT

Systems and methods incorporating an embedded sensor in a control stick to detect the presence of an object, such as a thumb. A presence detect signal may be generated by the additional sensor and auto calibration logic then may automatically remove bias from the control stick in real time when the presence detect signal indicates the control stick is not under the influence of a force external to the controller, and therefore at its neutral mechanical position. In further embodiments, embedded sensors are arrayed across an exterior surface of a control stick as a secondary control stick-based positional input device. In such embodiments, tactile or proximity sensor technology may be applied to either improve precision of first positional information generated by the control stick or to control a coordinate space separate from that controlled by first position information provided by the control stick.

16 Claims, 16 Drawing Sheets

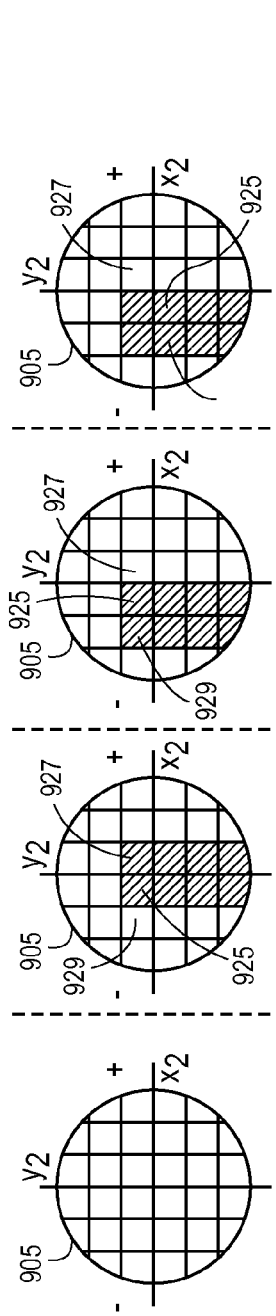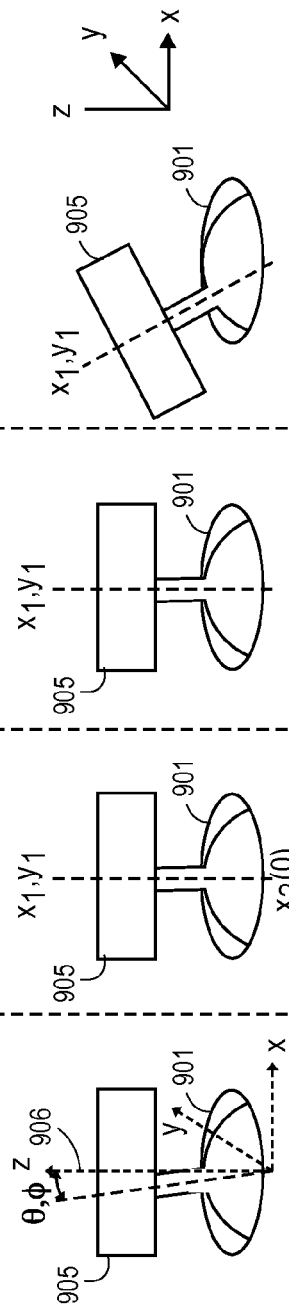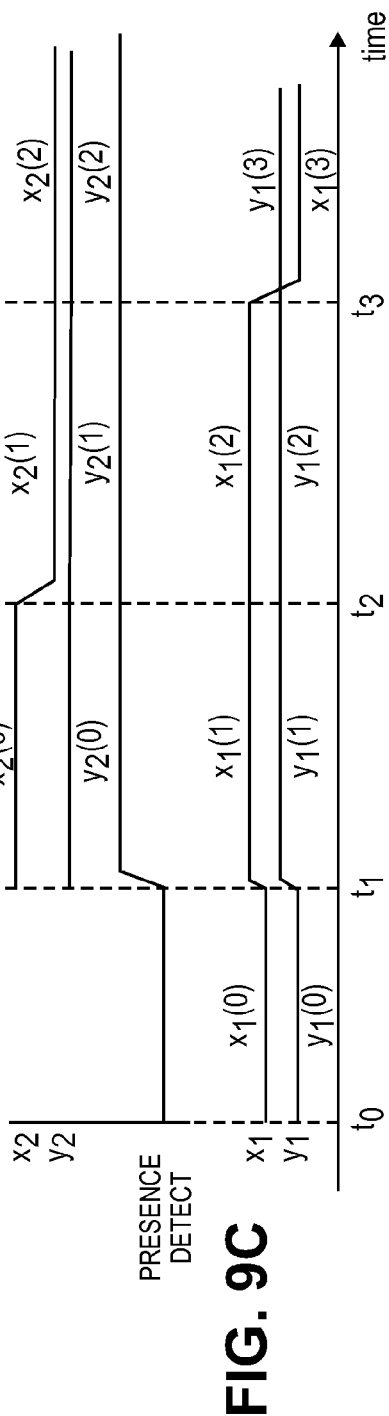
FIG. 9A
FIG. 9B
FIG. 9C

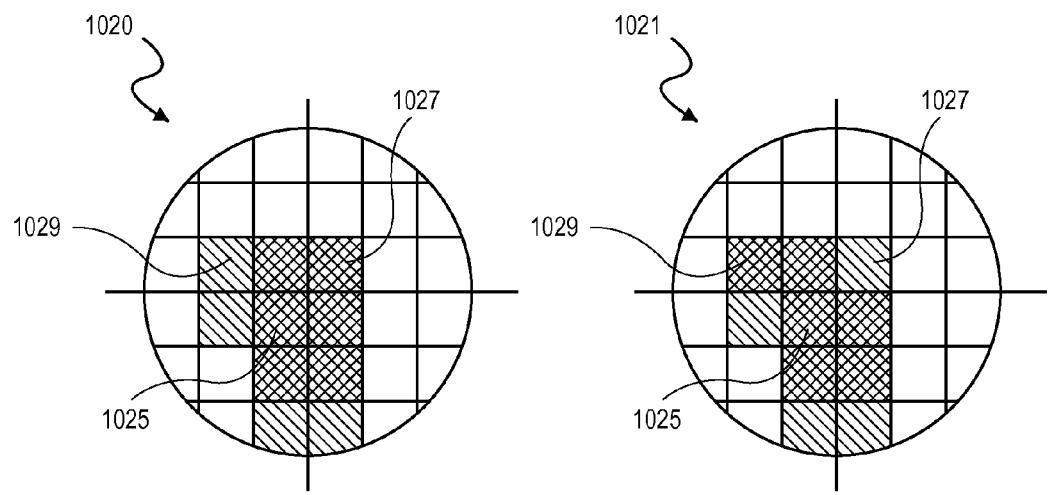
FIG. 10A  FIG. 10B

MULTI-SENSORED CONTROL STICK FOR ENHANCED INPUT SENSITIVITY AND FUNTIONALITY

FIELD

The present invention relates to computer input devices and more particularly to a control stick employing a plurality of input sensor types.

DESCRIPTION OF RELATED ART

Even with the recent advances in performance capture (i.e., tracking of a system user's motion to induce a corresponding effect on a displayed graphic), a handheld controller with a control stick remains the most popular input device for the electronic game industry. FIG. 1A depicts a Sony DualShock 3® handheld controller 100 commercially available for a Sony Playstation® series of electronic gaming platforms. The handheld controller 100 includes dual thumb sticks 105 protruding from the controller body 101. Each thumb stick 105 provides a two-dimensional input (X,Y) which may be used to induce a corresponding effect on a displayed graphic. Each thumb stick 105, sometimes called an analog stick or more generally a control stick, provides positional input to a computing platform based on the position of the protrusion relative to a mechanical "center" position within the controller body 101. During use, a user's thumb typically rests on a top surface of each thumb stick 105 and force applied by the thumb changes the position of the thumb stick 105 relative to the center position. A pivoting base of each thumb stick 105 is coupled to two or more potentiometers housed within the controller body 101 to provide a continuous electrical output proportional to the angle or position of the thumb stick 105 relative to the center position (hence, the term "analog stick").

While the greater control afforded by the continuous nature of the thumb stick 105 has made it a more popular input device (particularly for 3D games) than a digital directional input device, such as the directional pad (D-pad) 110 shown in FIG. 1, the thumb stick 105 may nevertheless lack precision around the center position. The lack of precision is not necessarily limited by the analog resolution, but is typically due in large part to a "dead zone" imposed by firmware or software within the controller 100 or the computing platform which receives the positional information (e.g., X,Y) output from the controller 100.

FIG. 1B illustrates a dead zone 103 surrounding a center ("home") position 111 in a coordinate space mapped to the mechanical range of the thumb stick 105. The effect of the dead zone 103 is that any offsets from the center position 111 within the zone are ignored (i.e., treated as zero) to avoid unintentional input from the controller 100. For example, the thumb stick 105 may be moved to the point 120 and the associated X,Y output is ignored because it is within the dead zone 103. One reason for imposing the dead zone 103 is the thumb stick 105 is subject to mechanical wear over time and will develop a "bias" whereby the mechanical center moves, causing the center position 111 to drift. When bias becomes larger than the dead zone 103, for example when center moves to 115 in FIG. 1B, positional output from the controller 100 will be input into a graphics rendering engine (i.e., not ignored) even in the absence of actual user input (e.g., with the controller 100 sitting idle). At that point, a user may be motivated to perform a calibration routine whereby $\Delta y_1$ and $\Delta x_1$ are determined to "re-center" mapping of positional information around the new mechanical center of the thumb stick 105.

The size of the dead zone 103 is therefore a function of how often calibration routines may be imposed on a user and since an offset from center my change from one use to the next, it is conventional in the art to sacrifice a considerable amount of precision about the center position in favor of perceived controller robustness. Means and techniques to improve the responsivity of the thumb stick 105 by reducing the adverse effects of mechanical wear and the concomitant use of large dead zones is therefore advantageous.

As further illustrated in FIG. 1A, it remains convention to include a suite of controls on the controller 100 including supplemental positional controls, such as the D-pad 110, which, like the thumb stick 105, also output positional information in a least two directions (e.g., X,Y). Other controls include command buttons 109 which may provide one-touch access to any number of functions supported by the computing platform to which the controller 100 is communicatively coupled. Both supplemental positional controls and command buttons, however, impose a physically larger controller 100 and also require a user's thumb for actuation. Use of the D-pad 110 and command buttons 109 therefore necessitate moving a thumb off one of the dual thumb sticks 105, traversing a distance within a thumb's reach to actuate the D-pad 110, and then returning to rest on the thumb stick 105. This activity requires considerable time and dexterity to perform, and because of the range of motion required, may contribute to user fatigue. Means and techniques to improve accessibility and accuracy of supplemental positional controls and command buttons are therefore also advantageous.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

FIGS. 9A-9C illustrate plan views, side views and a timing diagram, respectively, for a presence detect signal as well as first and second positional information from a control stick incorporating a sensor array, in accordance with embodiments of the present invention;

FIGS. 10A and 10B illustrate a multi-level sensor array mapping a pressure level across a surface of a control stick, in accordance with an embodiment of the present invention;

Figure 1A:
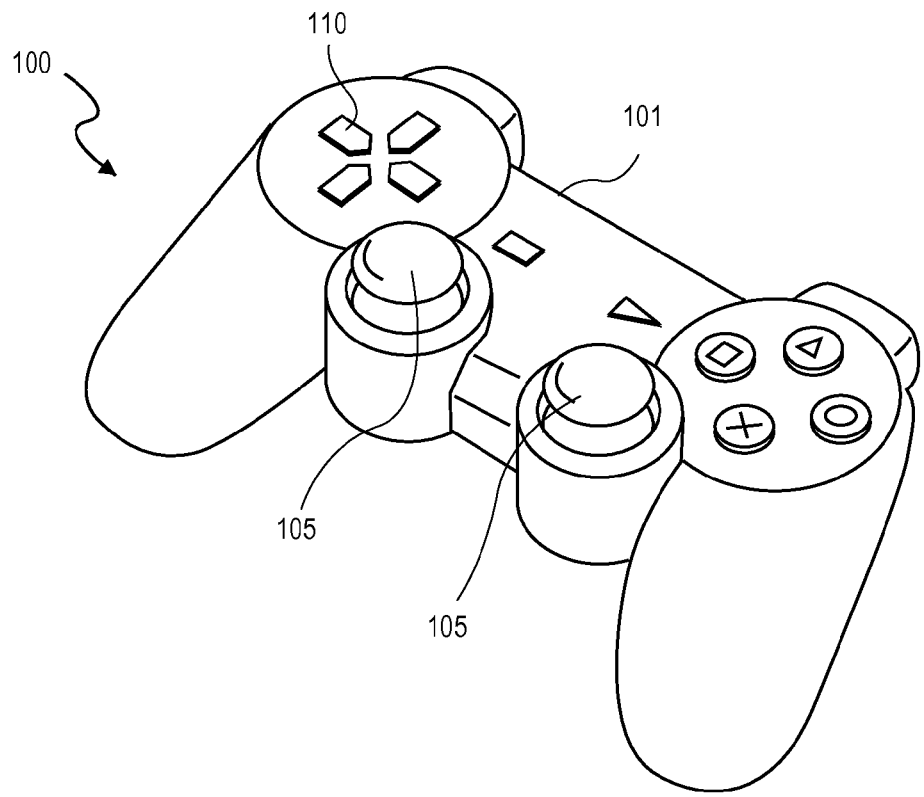
FIG. 1A illustrates an isometric view of a conventional handheld electronic game controller.
Figure 1B:
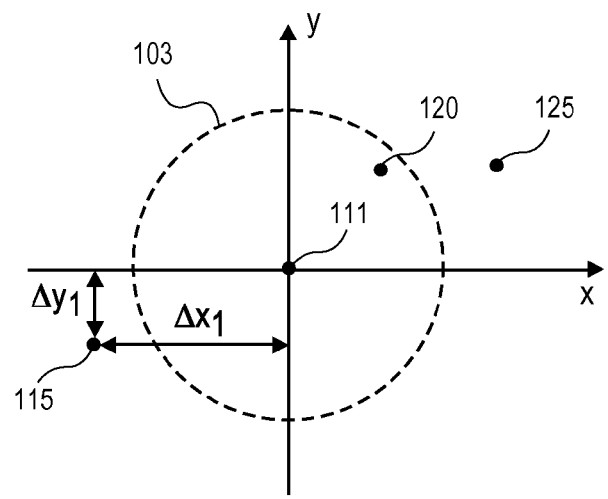
FIG. 1B illustrates a graph of a coordinate space mapped to output of a control stick of the conventional handheld controller illustrated in FIG. 1.

For clarity of illustration, elements illustrated in the figures have not necessarily been drawn to scale. Further, where considered appropriate, reference numerals have been repeated among the figures to indicate corresponding or analogous elements.

DETAILED DESCRIPTION

Described herein are methods and systems for improving responsivity and functionality of a handheld controller control stick. In embodiments, need for a dead zone about a center position of a control stick is reduced by incorporating at least one additional sensor into a controller, for example, embedded into a surface of the control stick to detect the presence of an object, such as a thumb in the case of a thumb stick like that illustrated in FIG. 1A. A presence detect signal is generated from the additional sensor and auto calibration logic may then remove bias from the control stick in real time when the presence detect signal indicates the control stick is not under the influence of a force external to the controller, and therefore, at its neutral mechanical position.

In further embodiments, a plurality of additional sensors is arrayed across an exterior surface of a control stick to provide a second control stick-based positional input device. In such embodiments, tactile or proximity sensor technology may be applied to either improve precision of first positional information generated by the control stick or to control a coordinate space separate from that controlled by the first position information provided by the control stick.

For generation of either or both a presence detect signal and second positional information, capacitive or other touchpad technology may be embedded into the control stick. Similarly, any of photonic, acoustic or thermal sensing techniques may alternatively be employed as proximity detectors for generation of either or both a presence detect signal and second positional information.

While numerous specific details are set forth in order to provide a thorough understanding of embodiments of the invention, it will be understood by those skilled in the art that other embodiments may be practiced without these specific details. In other instances, well-known techniques, hardware components, and software algorithms are not described in detail so as not to obscure the present invention. Some portions of the description herein are presented in terms of algorithms and symbolic representations of operations on data bits or binary digital signals within a computer memory.

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Unless specifically stated otherwise, as apparent from the following discussions, it is appreciated that throughout the specification discussions utilizing terms such as "processing," "detecting," "determining," or the like, refer to the action and/or processes of circuitry, a computer, or similar electronic computing device, that manipulate and/or transform data represented as physical, such as electronic, quantities within registers and/or memories into other data similarly represented as physical quantities within the memories and/or registers.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

In embodiments, an embedded sensor is disposed in a control stick. The sensor is to serve as the basis for distinguishing between an idle/inactive state and an active state of the control stick separate from the actuator coupled to the control stick generating first positional information $(X_1,Y_1)$ in response to displacement of the control stick (relative to the controller). For example, in an analog control stick having one or more potentiometers responsible for generating the first positional information $(X_1,Y_1)$; the sensor is to provide a means of detecting the application of force to the control stick separate from the potentiometers.

Advantageously, the embedded sensor may detect a level of presence necessary but insufficient to physically displace the control stick. This is not to say that it is to be impossible to physically displace the control stick without generating a presence detect signal, but rather that the embedded sensor and supporting circuitry may generate a "presence detect" signal upon either physical contact (which would likely generate a displacement within the resolution of the actuators coupled to the control stick and responsible for generating the first positional information $(X_1,Y_1)$) or imminent physical contact (which would not generate any mechanical displacement within the resolution of the actuators).

In embodiments, the presence detect signal is made responsive to activity incidental to imminent application of a requisite force mechanically displacing the control stick for generating the first positional information $(X_1,Y_1)$. Therefore, in contrast to a conventional command button on a control stick (e.g., a "thumb stick down" command actuator), the embedded sensor is to generate a presence detect signal with no deliberate action of the user beyond that required to displace the control stick for the purpose of generating the first positional information $(X_1,Y_1)$. As such, the embedded sensor may be completely transparent (i.e., functionally invisible) to a user. The presence detect signal generated by the embedded sensor is then able to provide basis for reducing the dead zone and/or for correlation with the first positional information $(X_1,Y_1)$ so that the first positional information $(X_1,Y_1)$ may be deduced with greater sensitivity without requiring deliberate action of the user beyond that conventionally required to displace the control stick. The embedded sensor and circuitry to generate the presence detect signal may thereby integrate into any control stick without sacrifice of existing functionality and tactile feel. For example, the embedded sensor described herein may be added to the thumb stick 105 while maintaining substantially the same shape, feel, and function while providing greater positional sensitivity.

Figure 2A:
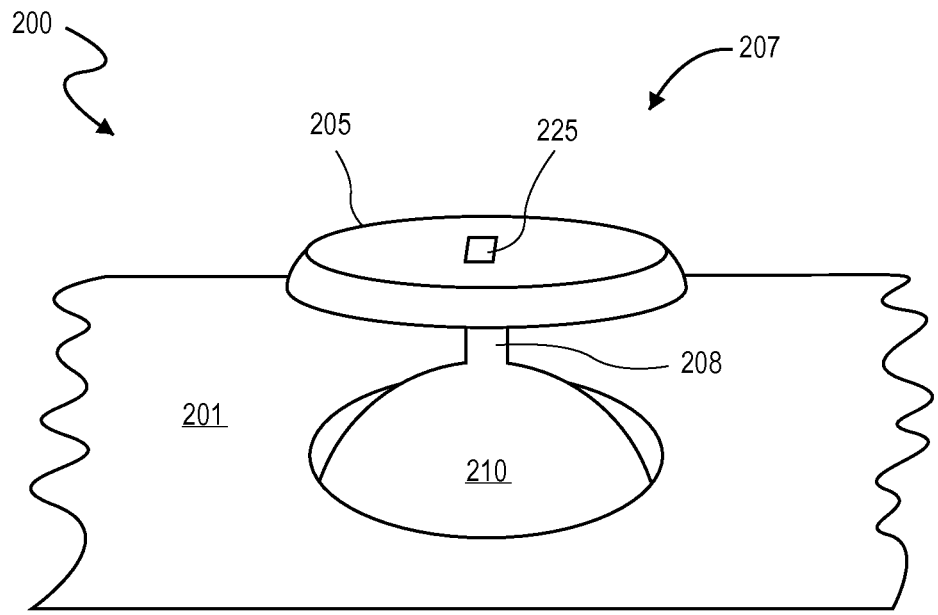
FIG. 2A illustrates an isometric view of a control stick with an embedded sensor, in accordance with an embodiment of the present invention.

In embodiments, an embedded sensor is disposed in some portion of the control stick. FIG. 2A illustrates an isometric view of a control stick 200 with an embedded sensor 225 disposed in a top surface 207 the control stick, in accordance with an embodiment of the present invention. As illustrated, the control stick includes a control stick cap 205 on a stem 208 protruding from a control stick base 210 confined by a controller body 201. The control stick stem 208 has a smaller outer diameter than that of the control stick cap 205. The embedded sensor 225 is to detect presence of an object in contact with, or in proximity to, the control stick cap 205 and the control stick is to provide first positional information corresponding to movement of the pivoting control stick base 210 relative to the controller body 201. In one embodiment, the control stick 200 is a drop-in replacement for the thumb stick 105 illustrated in FIG. 1A. For such embodiments, each of the dual thumb sticks 105 may be replaced with the control stick 200 having at least the single embedded sensor 225.

Figure 2B:
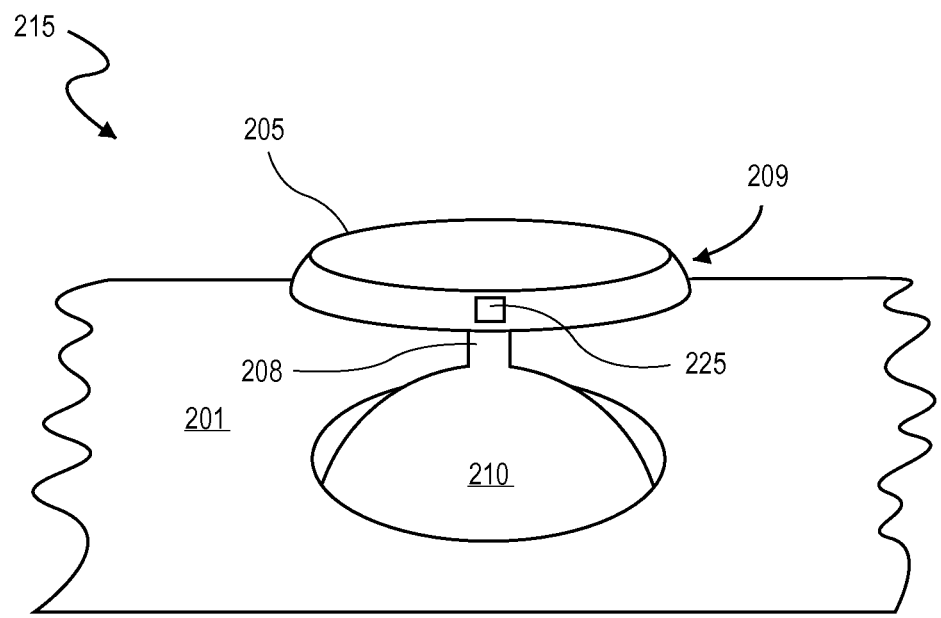
FIG. 2B illustrates an isometric view of a control stick with an embedded sensor, in accordance with an embodiment of the present invention
Figure 2C:
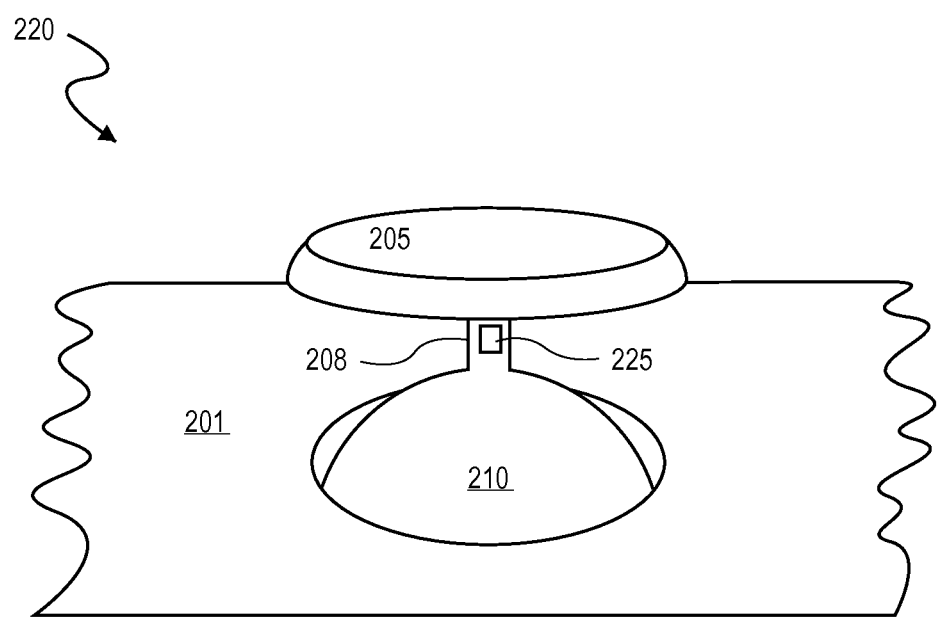
FIG. 2C illustrates an isometric view of a control stick with an embedded 1D sensor array, in accordance with an embodiment of the present invention.

FIG. 2B illustrates an isometric view of a control stick 215 with the embedded sensor 225 disposed in a sidewall 209 of the control stick cap 205, in accordance with another embodiment of the present invention. FIG. 2C illustrates an isometric view a control stick 215 with the embedded sensor 225 disposed in the control stick stem 208. Other alternatives include a sensor disposed in the control stick base 210.

Figure 3A:
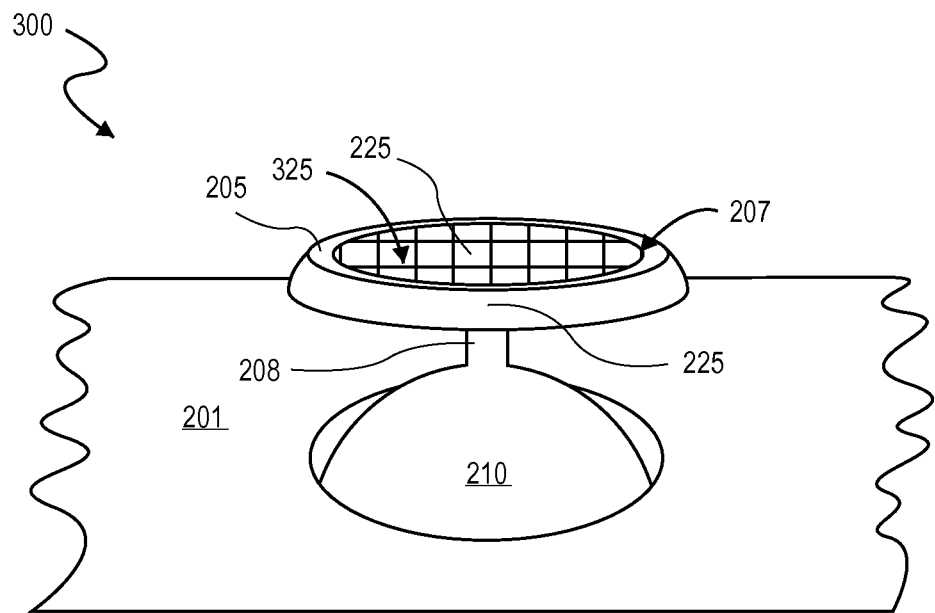
FIG. 3A illustrates an isometric view of a control stick with an embedded 1D sensor array, in accordance with an embodiment of the present invention.
Figure 3B:
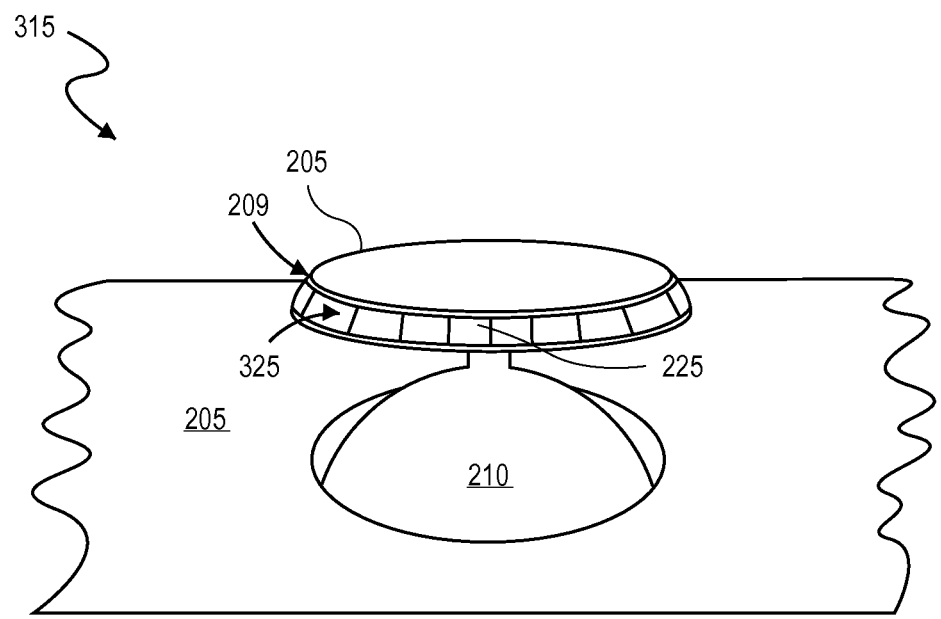
FIG. 3B illustrates an isometric view of a control stick with an embedded 2D sensor array, in accordance with an embodiment of the present invention.
Figure 3C:
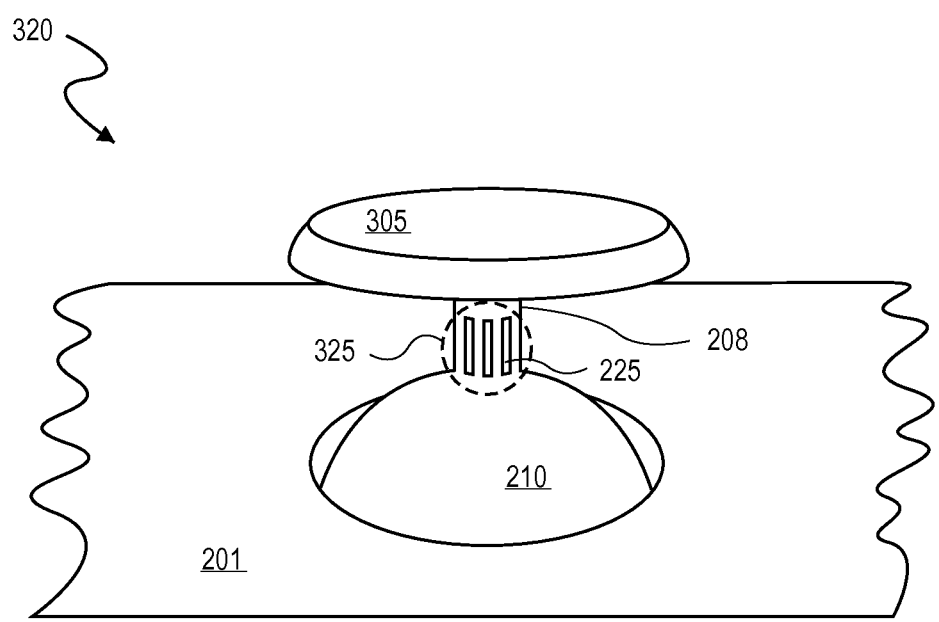
FIG. 3C illustrates an isometric view of a control stick with an embedded 2D sensor array, in accordance with an embodiment of the present invention.

In embodiments, a plurality of embedded sensors operable to detect an object in contact with, or in proximity to, the control stick is disposed in the control stick. The plurality of embedded sensors may be arrayed across an exterior surface in any manner to form a mesh network of sensor points. FIG. 3A illustrates an isometric view of a control stick 300 with a two dimensional (2D) sensor array 325, in accordance with an embodiment of the present invention. The sensor array 325 includes one than one embedded sensor 225 across the top surface 207 of the control stick 200. FIG. 3B illustrates an isometric view of a control stick 315 with a one dimensional (1D) sensor array 325, in accordance with an embodiment of the present invention. The 1D sensor array 325 includes a row of embedded sensors 225 wrapping around a perimeter of the control stick cap sidewall 307. Alternatives also include 1D and 2D arrays for across the top surface 207 or sidewall 209, respectively. FIG. 3C illustrates an isometric view of a control stick 320 with a 1D sensor array 325 in the control stick stem 208, in accordance with an embodiment of the present invention. The sensor array 325 includes more than one sensor 325 arrayed around the control stick stem 208.

Generally, the sensor embedded in the control stick may be any tactile sensor or proximity sensor known in the art that is capable of independently generating a presence detect signal when the control stick is being used for inputting first positional information $(X_1,Y_1)$ (i.e., the control stick is in an active state). In a first embodiment, the embedded sensor 225, 325 is a tactile sensor which detects contact of an object with the control stick. For thumb stick embodiments, the object is presumed to be a user's thumb, however depending on the tactile sensor technology employed, certain passive objects may also be sensed. In the exemplary embodiments, the tactile sensor is to detect a capacitance, a resistance, a force applied, or changes thereof, at an exterior surface of the control stick.

Figure 4A:
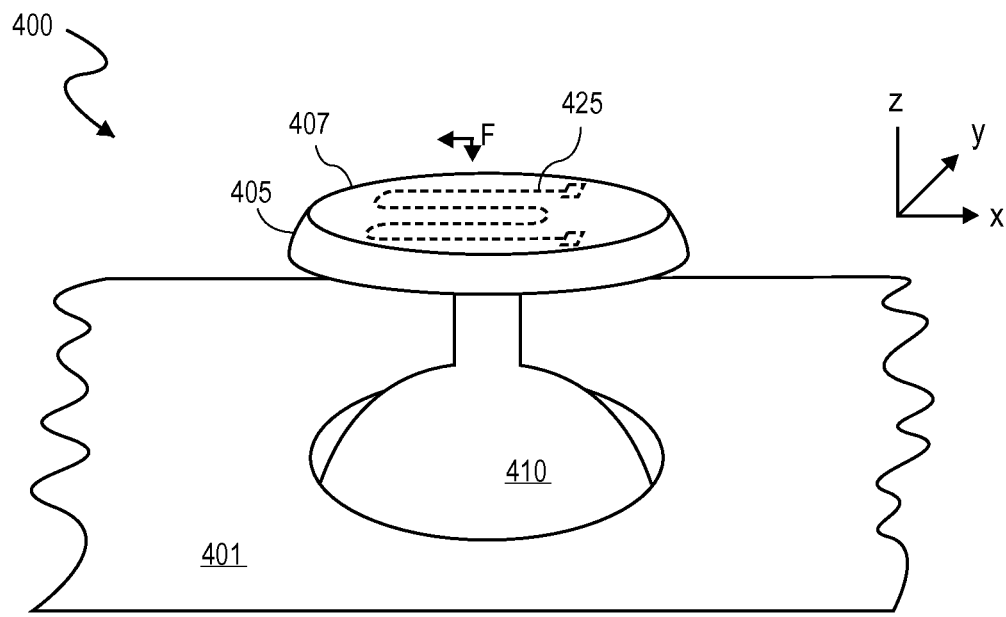
FIG. 4A illustrates an isometric view of a control stick with an embedded sensor for detecting a force from object in contact with the control stick, in accordance with an embodiment of the present invention.

Capacitance sensing embodiments implement any of the sensor or sensor array configurations previously described herein (e.g., in FIGS. 2A-3C) to register a capacitance or change in capacitance as a user's thumb contacts the control stick. Force sensing embodiments detect a deformation (distortion or otherwise) of some portion the control stick. In one embodiment, a strange gauge is embedded in control stick (e.g., in any of locations illustrated in FIGS. 2A-3C) to register an electrical resistance change as a localized region of the control stick is deformed in response to a load force (e.g., from a thumb) having a component driving a displacement of the control stick 400 in a first or second dimension. For example, in the control stick 400 illustrated in FIG. 4A a strain gauge 425 of the foil type is disposed below a deformable top skin or pad on the control stick cap 405 and a presence detect signal is to be generated when the foil is deformed by the load force F. Of course, semiconductor (piezoresistive) gauges may also be utilized in this same capacity as a foil gauge. While the load force F has a component along the dimensions x or y driving a displacement of the control stick 300 along either dimension, deformation detected may either by that force component or by an accompanying component in the z dimension. For example, the strain gauge 425 may detect a deformation in the top skin resulting from a threshold pressure on a top surface of the control stick cap. In this force sensing embodiment, the strain gauge 425 is to detect the pressure (normal, z component of the load force F) needed to displace the control stick in the x or y dimension by friction between the object and the control stick. As another example, the strain gauge 425 may be disposed about a perimeter of the control stick cap 405 to detect deformation in the top skin resulting from pressure on a sidewall of the control stick cap 405 parallel to the load force component in the x or y dimension.

Figure 4B:
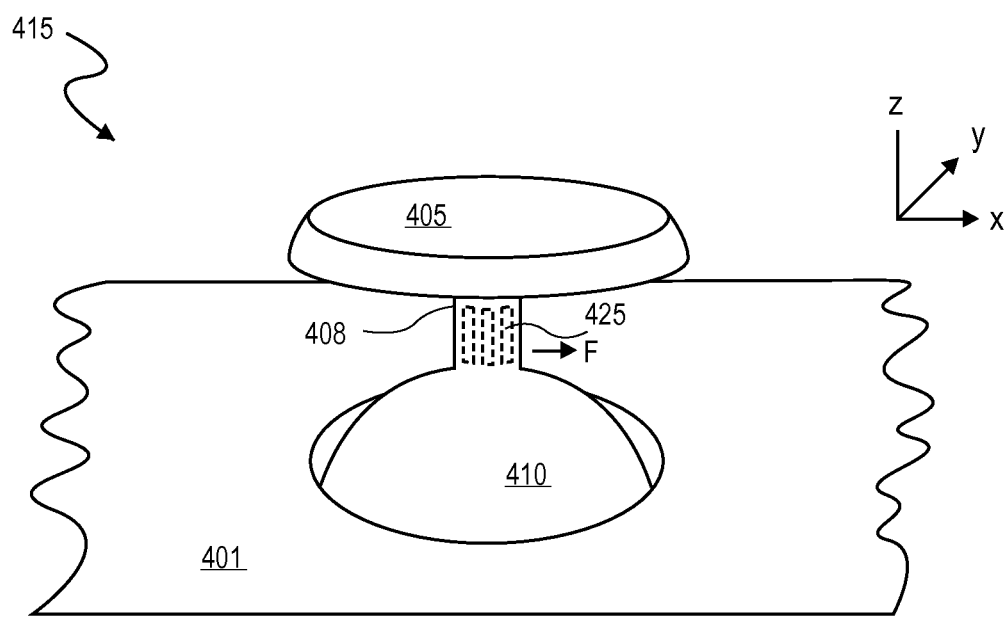
FIG. 4B illustrates an isometric view of a control stick with an embedded sensor for detecting a force from object in contact with the control stick, in accordance with an embodiment of the present invention.

In another force sensing embodiment, at least one piezoresistive sensor is disposed in the stem of the control stick to deform as a driving force is transferred from an object contact point down to the pivoting base of the control stick. For example, in the control sticks illustrated in FIG. 4B, a plurality of semiconductor strain gauges 425 is disposed in the stem 408 and a presence detect signal is generated when any one of the strain gauges 425 deforms as the force F having some component along the dimensions x or y is transferred to the pivoting base 410 to drive a displacement of the control stick 300 in either dimension against a force of one or more return spring.

Figure 4C:
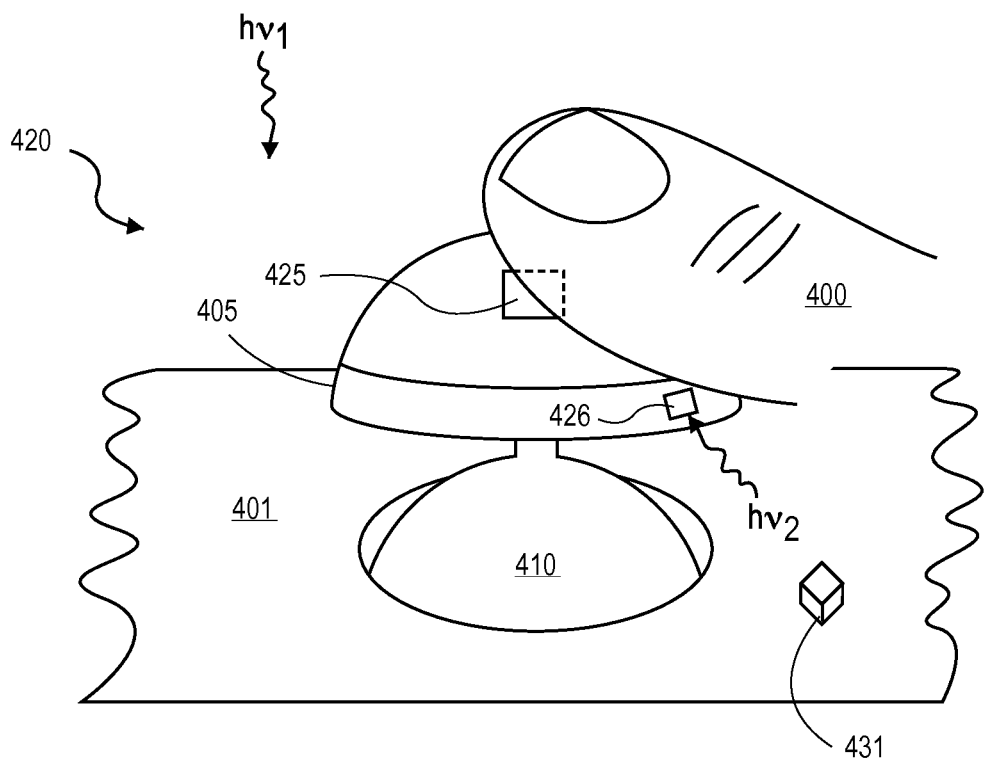
FIG. 4C illustrates an isometric view of a control stick with an embedded sensor for detecting an object in proximity to the control stick, in accordance with an embodiment of the present invention.

In embodiments, the embedded sensor comprises a proximity sensor to detect an object within a threshold distance from a surface of the control stick. The proximity sensor is to generate a presence detect signal for transitioning the control stick to an active state before a force is applied to displace the control stick. For thumb stick embodiments, a detected object is presumed to be a user's thumb, however depending on the proximity sensing technology employed, certain passive objects may also trigger the presence detect signal. FIG. 4C illustrates an isometric view of a control stick 420 with exemplary embedded proximity sensor embodiments. An embedded proximity sensor 425 and/or 426 is disposed on the control stick cap 405. In the illustrated example, the proximity sensor 425 is a photodetector sensitive to radiation, such as ambient light, having radiation $hv_1$. A presence detect signal may be generated as the photodetector becomes shadowed from the radiation by thumb 400 and occluded while the control stick 420 is in use for inputting first positional information via displacement of the control stick 420.

In embodiments, proximity sensing relies on components disposed in a controller body. For example, in FIG. 4C the proximity sensor 426 may be a photodetector sensitive to radiation $hv_2$ which may be a narrow band emission and IR, for example, which is emitted from an LED 431 disposed in the controller body 401. As the thumb 400 moves into position to displace the control stick 420, a presence detect signal is generated in response to the photodetector 426 becoming shadowed from the emission of the LED 431. Such narrow band photodetector embodiments are advantageously insensitive to ambient light levels and therefore less are likely to generate false positive presence detect signals (i.e., presence detected from other than intentional control stick use) resulting from a dark environment.

Figure 4D:
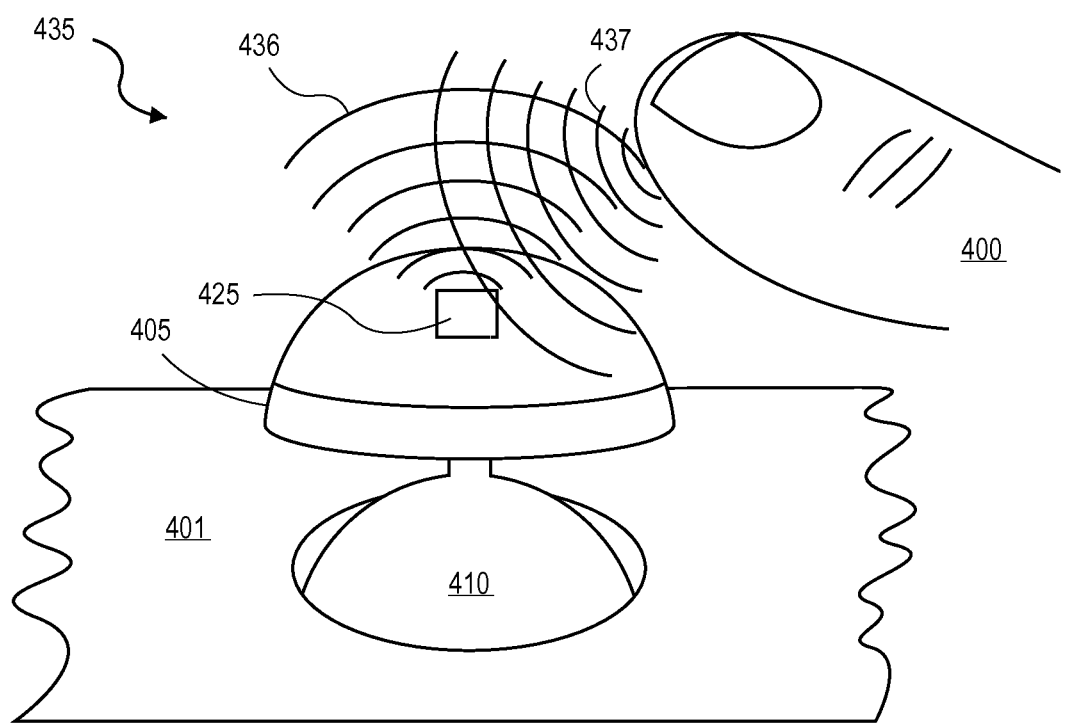
FIG. 4D illustrates an isometric view of a control stick with an embedded sensor for detecting an object in proximity to the control stick, in accordance with an embodiment of the present invention.

As another illustration of a proximity sensor, FIG. 4D illustrates an isometric view of the control stick 435 with an embedded sensor 425 forming a portion of an acoustic transceiver which emits sound 436 (e.g., ultrasonic). Sound 437 reflected as thumb 400 approaches the control stick cap 405 and is detected by the embedded proximity sensor 425. A presence detect signal may then be generated upon the reflected sound 437 indicating the thumb 400 is at a threshold proximity to the control stick 420. Other proximity sensing technologies may be similarly employed, for example projective capacitive touch sensing or thermal sensing may be utilized.

Figure 5A:
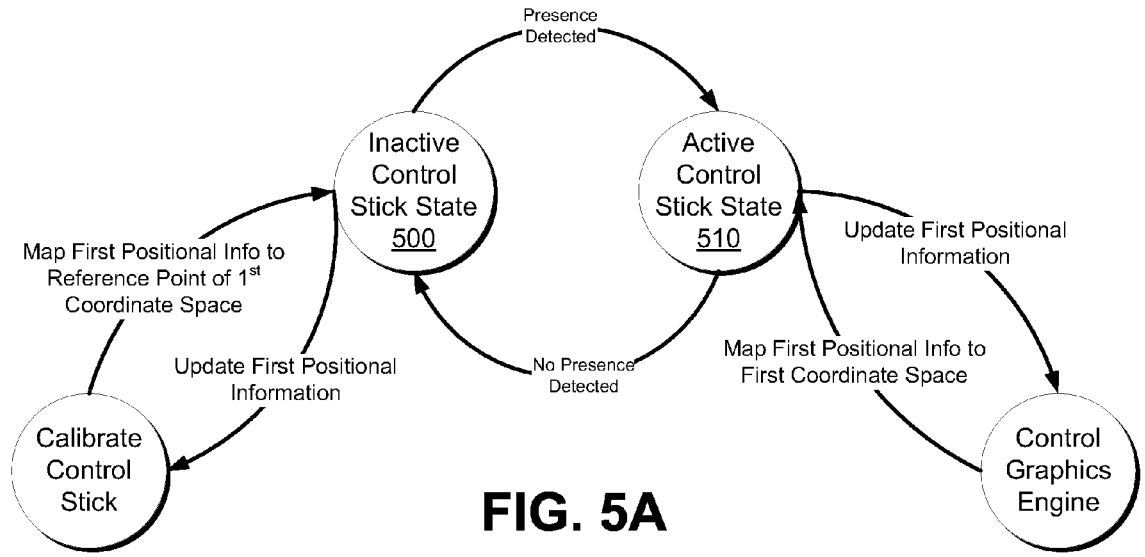
FIG. 5A illustrates a state diagram for a control stick with an inactive state, in accordance with an embodiment of the present invention

FIG. 5A illustrates a state diagram for a control stick, in accordance with an embodiment of the present invention. As shown, the control stick is provided with an "inactive" state 500 in addition to an "active" state 510 with the presence detect signal demarking the two states. A presence detect signal indicative of the control stick being intentionally used as a positional input device (e.g., logic high or logic low) causes the control stick to be placed in the active state 510 during which first positional information is mapped to a first coordinate space, for example generated by a graphics engine in the exemplary context of an electronic gaming platform. A presence detect signal indicative of the control stick not being intentional used as positional input device (e.g., logic low or logic high) causes the control stick to be placed in the inactive state 500 during which first positional information is mapped to a reference point of the first coordinate space as part of an automatic, real time calibration routine. With each transition from inactive to active states, mapping of the first positional information to a coordinate space may be made with very high precision given the input immediately follows a previous automatic zeroing of the control stick position.

Figure 5B:
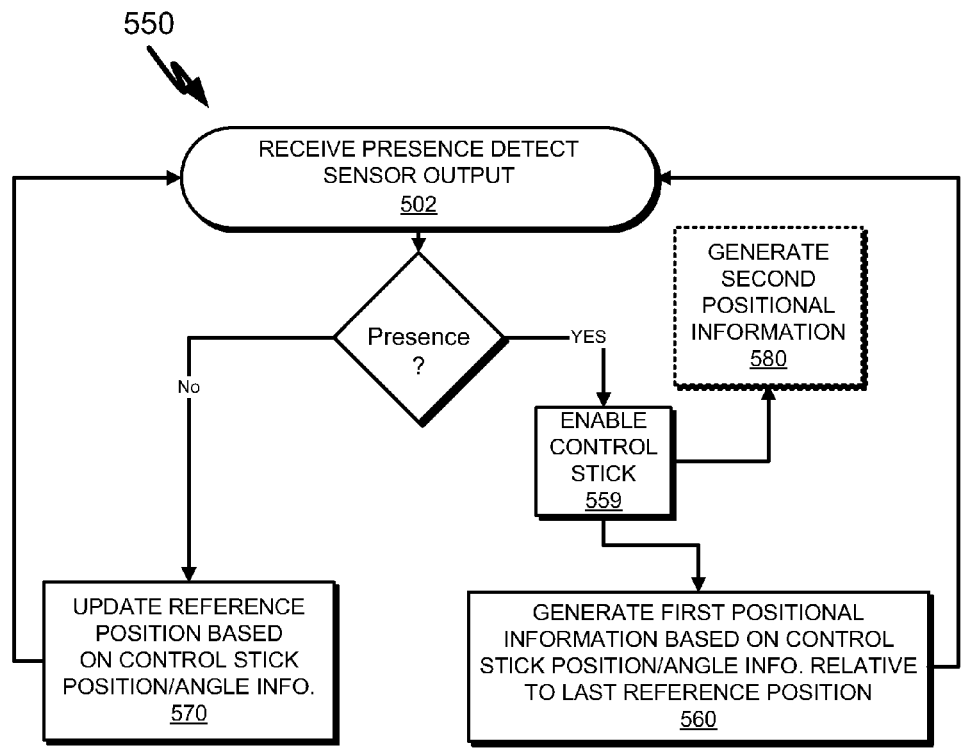
FIG. 5B is a flow diagram illustrating an automated method of calibrating a control stick based on a presence detect signal, in accordance with embodiments of the present invention.

FIG. 5B is a flow diagram illustrating an automated method 550 of enabling a control stick based on a presence detect signal, in accordance with embodiments of the present invention. Beginning at operation 502, a presence detect sensor output is received. If the value of the presence detect signal is indicative of no object (thumb) presence, the control stick is not enabled for graphic object control (inactive state 500). The method 550 proceeds to operation 570 to perform an automated calibration routine where a reference point (e.g., zero, center, home, etc.) in a first coordinate space is mapped to the current mechanical position or angle of the controller as output by the first positional transducer (e.g., potentiometer).

If instead the value of the presence detect signal is indicative of an object's (thumb) presence, the method 550 proceeds to operation 559 where the control stick is enabled for graphic object control (i.e., advanced to the active state 510). In a first embodiment, at operation 560 first positional information $(X_1, Y_1)$ is generated output by the first positional transducer (e.g., potentiometer) and mapped to a coordinate space relative to the last reference position determined at operation 570.

In a further embodiment, as further described elsewhere herein, where the control stick includes an array of embedded sensors, second positional information $(X_2, Y_2)$ is generated by mapping the output from the embedded sensor array to a second coordinate space upon enabling the control stick at operation 559.

Figure 6:
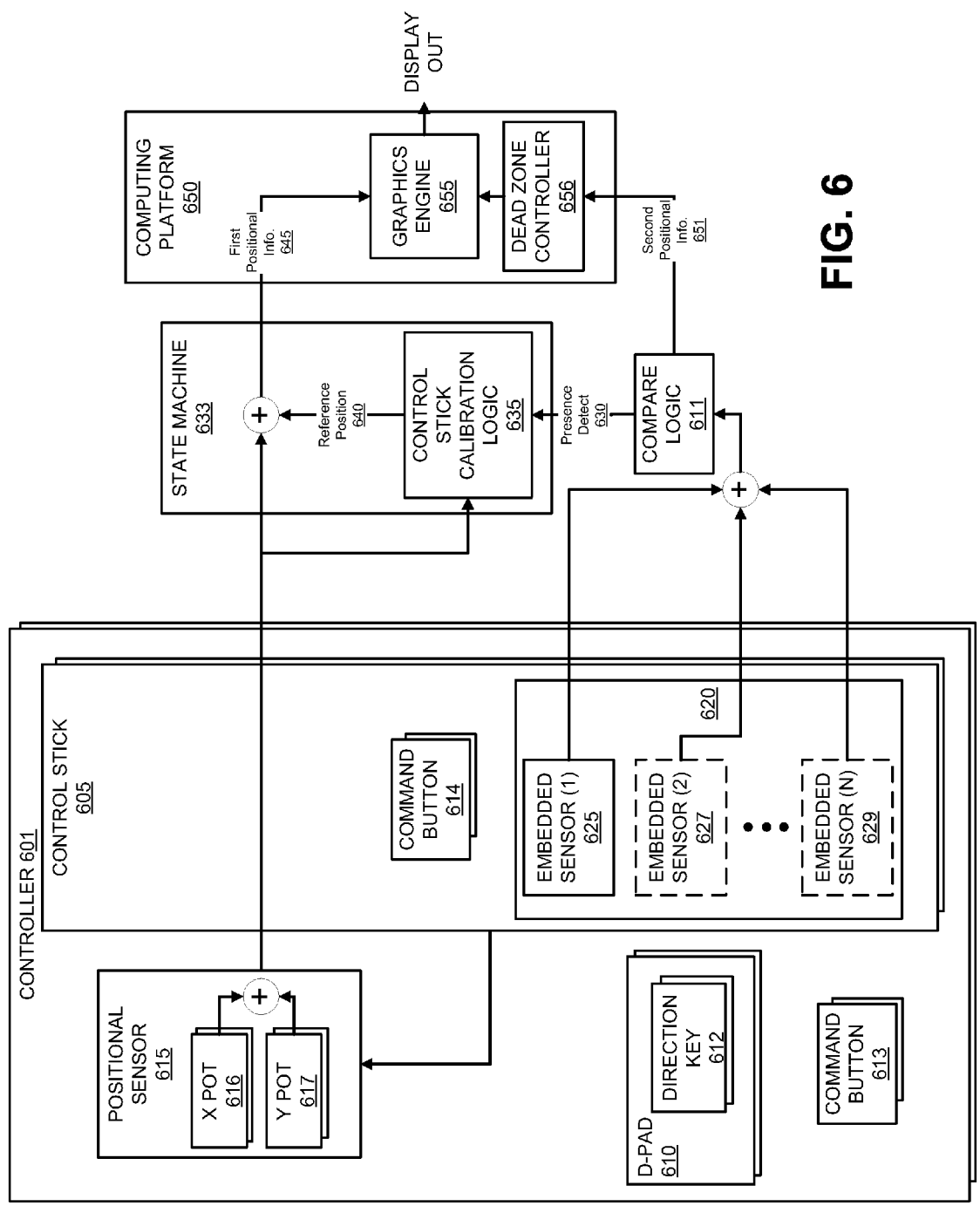
FIG. 6 is a functional block diagram of hardware to perform automatic calibration of a control stick and/or to provide second positional information, in accordance with embodiments of the present invention.

FIG. 6 is a functional block diagram of hardware to perform automatic calibration of a control stick in real time and/or to provide second positional information, in accordance with embodiments of the present invention. Controller 601 includes at least one control stick 605 though, as illustrated by the block underlying the control stick 605, there may be more than one control stick 605 for the controller 601. The controller 601 further includes a positional sensor 615 coupled to the control stick 605, which transduces displacement (angular or otherwise) of the control stick 605 into first positional information $(X_1, Y_1)$. In the exemplary embodiment illustrated positional sensor 615 further includes an X potentiometer 616 and a Y potentiometer 617. The controller 601 further includes any number of command buttons 613 and D-Pad 610 with at least one direction key 612.

The control stick 605 includes a command button 614, for example a "thumb stick down" command which is actuated by displacing the control stick 605 downward relative to a body of the controller 601. The control stick 605 further includes at least one embedded sensor 625 which, as illustrated by the additional embedded sensors 627 and 629 in dashed line, may be arrayed to form an embedded sensor array 620.

Output from the embedded sensor 625, or sensor array 620, is output to compare logic 611 where sensor output is compared to a threshold. Where the sensor output exceeds the threshold, the presence detect signal 630 is passed to a state machine 633 which advances the state of the control stick 605 (active state 500 or inactive state 510) based on the presence detect signal 630 output from the embedded sensor 625, sensors 620. For embodiments with an embedded sensor array 620, output from the array, a logical "and" is performed to generate the presence detect signal 630 if any of the n embedded sensors 625, 627, 629 generate output indicative of an object's presence.

Where the control stick state is determined to be inactive, control stick calibration logic 635 performs the automatic calibration method 550 to update the reference position. Where the control stick state is determined to be active, a first positional information $(X_1, Y_1)$ signal 645 is referenced to the reference position signal 645 output by the control stick calibration logic 635 and passed to a graphics engine 655 executing on a computing platform 650. For embodiments with an embedded sensor array 620, output from the array 620 is passed, as a second positional information $(X_2, Y_2)$ signal 651, to the graphics engine 655. The graphics engine 655 then outputs a graphical object(s), as controlled by at least the first positional information, to a display.

In one embodiment, the control stick calibration logic 635 is circuitry, firmware, and/or software, physically disposed within a body of the controller 601. For such embodiments, real time removal of control stick bias is wrapped and invisible to the computing platform 650. For such embodiments, applications executing on the computing platform 650 may include a flag which a user may set to reduce or eliminate a control stick dead zone imposed on the first positional information signal 645. Alternatively, a control stick dead zone may reduced or eliminated automatically where the computing platform 650 is executing an application configured with a dead zone controller 656 to receive the presence detect signal 630 or the second positional information signal 651 (for sensor array embodiments) and adjust the dead zone depending on whether a presence detect signal 630 is output from the controller. Where a legacy controller provides no presence detect signal 630, the dead zone controller 656 would impose a larger dead zone than for a controller outputting a presence detect signal 630.

In another embodiment, the control stick calibration logic 635 is circuitry, firmware, and/or software, physically disposed within the computing platform 650. For such embodiments, applications executing on the computing platform 650 may include logic to reduce or eliminate a control stick dead zone imposed on the first positional information signal 645 in response to receipt the presence detect signal 630 or the second positional information signal 651 (for sensor array embodiments).

Figure 7A:
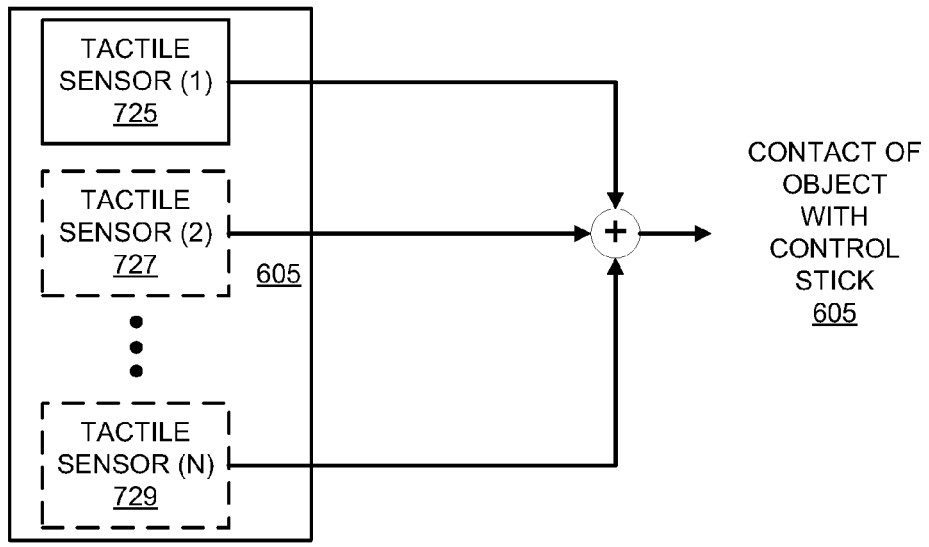
FIG. 7A is functional block diagram of hardware to determine contact of an object with a control stick, in accordance with embodiments of the present invention.
Figure 7B:
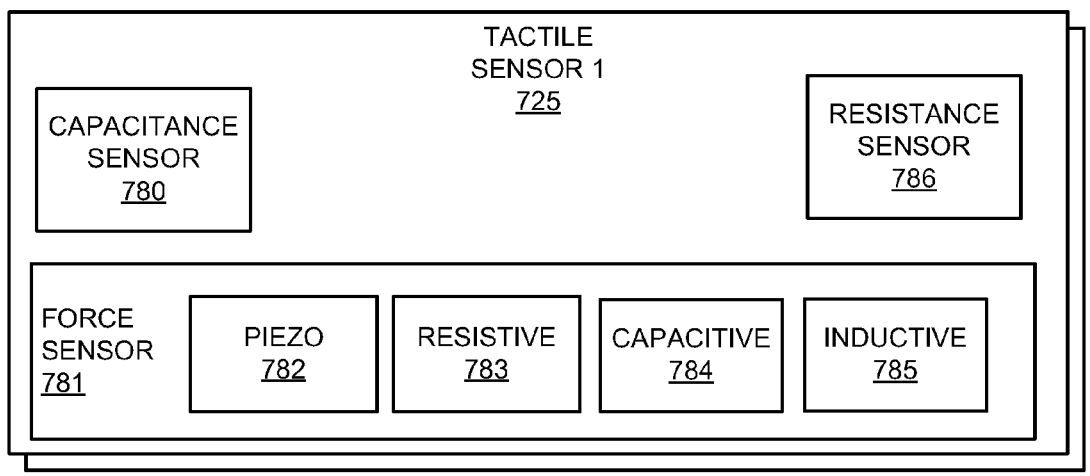
FIG. 7B is a functional block diagram of tactile sensing hardware, in accordance with embodiments of the present invention.

FIG. 7A is functional block diagram of hardware to determine contact of an object with the control stick 605, in accordance with embodiments of the present invention. For contact sensing embodiments, the embedded sensor 625 is a tactile sensor and the control stick 605 includes one or more tactile sensors 725, 727, 729 to register contact of an object with the control stick 605 upon either an absolute or relative measurement value exceeding a threshold level or a change thereof exceeding a threshold level. FIG. 7B is a functional block diagram of tactile sensing hardware, in accordance with embodiments of the present invention. In the exemplary embodiments, the tactile sensor 725 is capacitance sensor 780 or resistive sensor 786. For arrayed sensor embodiments, capacitive or resistive touch sensors 725, 727 and 729 form a touchpad disposed on a surface of the control stick 605. Capacitive and resistive touch sensor arrays may provide any number of sensing points with a resolution typical of conventional touch pads utilized for mobile computing platforms. In force sensing embodiments, a force sensor 781 may include any of a piezo (resistive or electric) sensor 782, resistive or elastoresistive sensor 783, capacitive sensor 784, or inductive sensor 785. Many variants each of these tactile sensing technologies are commercially available for implementing the sensor 725.

Figure 8A:
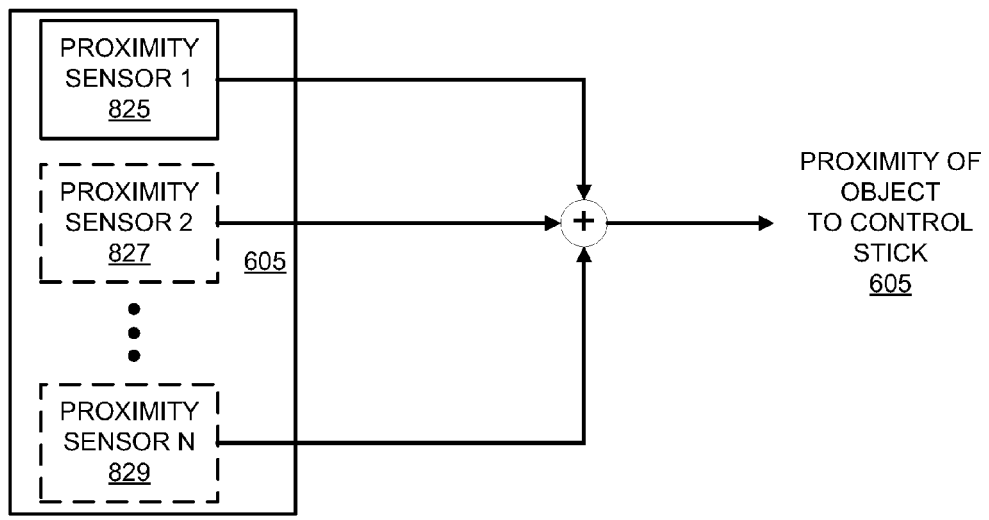
FIG. 8A is functional block diagram of hardware to determine proximity of an object with a control stick, in accordance with embodiments of the present invention.
Figure 8B:
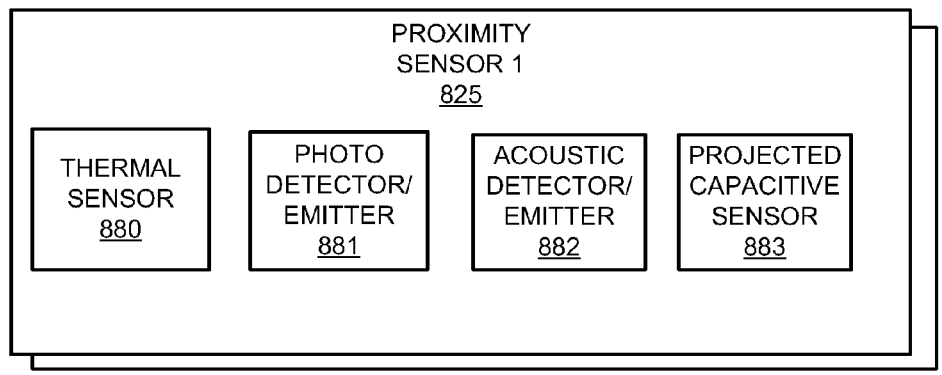
FIG. 8B is a functional block diagram of proximity sensing hardware, in accordance with embodiments of the present invention.

FIG. 8A is functional block diagram of hardware to determine proximity of an object with the control stick 605, in accordance with embodiments of the present invention. For proximity sensing embodiments, the embedded sensor 625 is a proximity sensor and the control stick 605 includes one or more proximity sensors 825, 827, 829 to register proximity of an object with the control stick 605 upon either an absolute or relative measurement value exceeding a threshold level or a change thereof exceeding a threshold level. For exemplary embodiments further illustrated in FIG. 8B, the proximity sensor 825 is a thermal sensor 880, photodetector and/or emitter 881, acoustic (e.g., ultrasonic) transceiver 882, or projected capacitive touch (PCT) sensor 883 disposed in the control stick 605.

Returning now with further discussion of operation 580, in embodiments employing an array of embedded sensors, second positional information may be determined from the control stick and utilized by the computing platform 650 in addition to the first positional information from the control stick. FIGS. 9A-9C illustrate plan views, side views and a timing diagram for first and second positional information from a control stick 905 incorporating a sensor array, in accordance with embodiments of the present invention. In this exemplary embodiment, the control stick 905 is implemented as a thumb stick. In a first epoch between time $t_0$ and time $t_1$, no thumb presence is detected by any sensor disposed on the control stick 905, presence detect is low, and the control stick 905 is in an inactive state. As shown in FIG. 9B, the control stick 905 deviates by an amount $\theta$, $\phi$ from a true mechanical center position along the z axis orthogonal to an x and y axis defined by the controller body. As shown in FIG. 9C, during the first epoch, the first positional information $X_1, Y_1$ is set to a reference position $X_1(0), Y_1(0)$, for example via the automatic calibration method 550 and there is no second positional information $(X_2, Y_2)$.

During a second epoch between time $t_1$ and time $t_2$, thumb presence is detected by embedded sensors of the array (e.g., 925 and 927) and the control stick 905 is advanced to an active state with $X_1(1)$ and $Y_1(1)$ being first positional information registering displacement of the control stick 905 by a user's thumb which happens to align the control stick 905 with the z-axis. Also during the second epoch, embedded sensors 925 and 927 define initial second position information $X_2(0)$, $Y_2(0)$ via any conventional array averaging technique, for example to identify a centroid of the plurality of sensors 925, 927, etc. registering presence of the thumb.

During a third epoch between time $t_2$ and time $t_3$, the control stick 905 remains at the same physical position relative to the controller body with $X_1(2)$, $Y_1(2)$ equal to $X_1(1)$, $Y_1(1)$. During this time, presence detect remains high, however presence of a user's thumb is now detected by embedded sensors 929 and 925, with sensor 927 no longer detecting a presence. In response, second positional information changes with $X_2(1)$, $Y_2(1)$ registering a centroid position change relative to $X_2(0)$, $Y_2(0)$.

During a fourth epoch occurring after time $t_3$, presence detect remains high as the control stick 905 is displaced by a thumb along the x-axis of the controller. First positional information $X_1$ registers the change as between $X_1(2)$ and $X_1(3)$. Presence of a user's thumb remains detected by embedded sensors 929 and 925 so that second positional information $X_2(2)$, $Y_2(2)$ remains static from the third epoch.

As illustrated by FIGS. 9A-9C, with an arrayed embedded sensor, the control stick 905 may provide second positional information independent from the first positional information in response to a change over time in the physical position of triggered sensors (e.g., centroid) detecting presence. In another embodiment, the control stick 905 provides second positional information independent from the first positional information in response to a change in level above a presence detect threshold over time. For example, FIGS. 10A and 10B illustrate a multi-level sensor array mapping a pressure across a surface of a control stick, in accordance with an embodiment of the present invention. In FIG. 10A sensors 1025 and 1027 register a first pressure level exceeding a threshold "presence detect" level while the sensor 1029 registers a second pressure level, also exceeding a threshold "presence detect" level, but as an example, is lower than the first pressure level. In FIG. 10B, the second pressure level registered by sensor 1029 changes (e.g., increases) to the first pressure level. Similarly, the first pressure level registered by sensor 1027 changes (e.g., decreases) to the second pressure level. As such, although the population of sensors detecting presence between FIGS. 10A and 10B doesn't change, a centroid position calculation may incorporate the multi-level sensing capability afforded by certain tactile (and proximity) detectors to generate the second positional information $(X_2, Y_2)$. In one embodiment, for example, a centroid position is determined by weighting each triggered sensor's position within the array by the sensed level.

Whether based on changes in triggered sensor location, triggered sensor level, or both, second positional information generated may enhance the functionality of a control stick. In a thumb stick embodiment, the second positional information is derived from the motion of the thumb (rather than both wrist and thumb) without need for the thumb to be displaced a great distance from the thumb stick. Centroid movement over time for such embodiment may be very small, less than 25% or even less than 10% of a sensor array dimension (e.g., width). As such, the second positional information may capture minute changes in a user's thumb pad location or pressure distribution relative to the thumb stick as the user's thumb pad deforms during a roll or pitch from one side to another in response to changes in the direction of force applied by the thumb against the thumb stick to displace the thumb stick in one direction to another.

In other embodiments, the second positional information captures much larger relative motion between a sensed object and the control stick. Centroid movement over time for such embodiments may be large, for example 25% or more of a sensor array dimension (e.g., width). For example, in one thumb stick embodiment, second positional information may be utilized to provide "swipe" functionality to the control stick to virtualize a track ball-type input device within the control stick. While real track ball functionality within a control stick would be hampered by the need to transfer a load force against the control stick centering springs to displace the control stick, the embedded sensor array may be utilized for input of second positional information merely by a user varying thumb pressure to affect the static friction force between the user's thumb and the control stick. A swipe would be registered as motion of the thumb across a surface of the control stick which would typically occur with the control stick at a home position since the user's thumb would not be holding the stick at any particular location during the swipe action.

In embodiments, the second positional information generated by a control stick sensor array is mapped to a coordinate space in an application executing on a computing platform. In one embodiment, the first positional information is mapped to a coordinate space different from that to which the second positional information is mapped. In alternative embodiment, the first and second positional information are mapped to a same coordinate space. In either embodiment, the second positional data may be capturing relatively large relative motion between a user's thumb and the control stick while the control stick is in a center, home position originate capturing minute relative motion between a user's thumb and the control stick correlated with, and in advance of, the control stick being displaced from a center position. As such, both the first and second embodiments may be implemented on a single control stick with micro scale second positional data being distinguished from macro scale second positional data by software.

Figure 11:
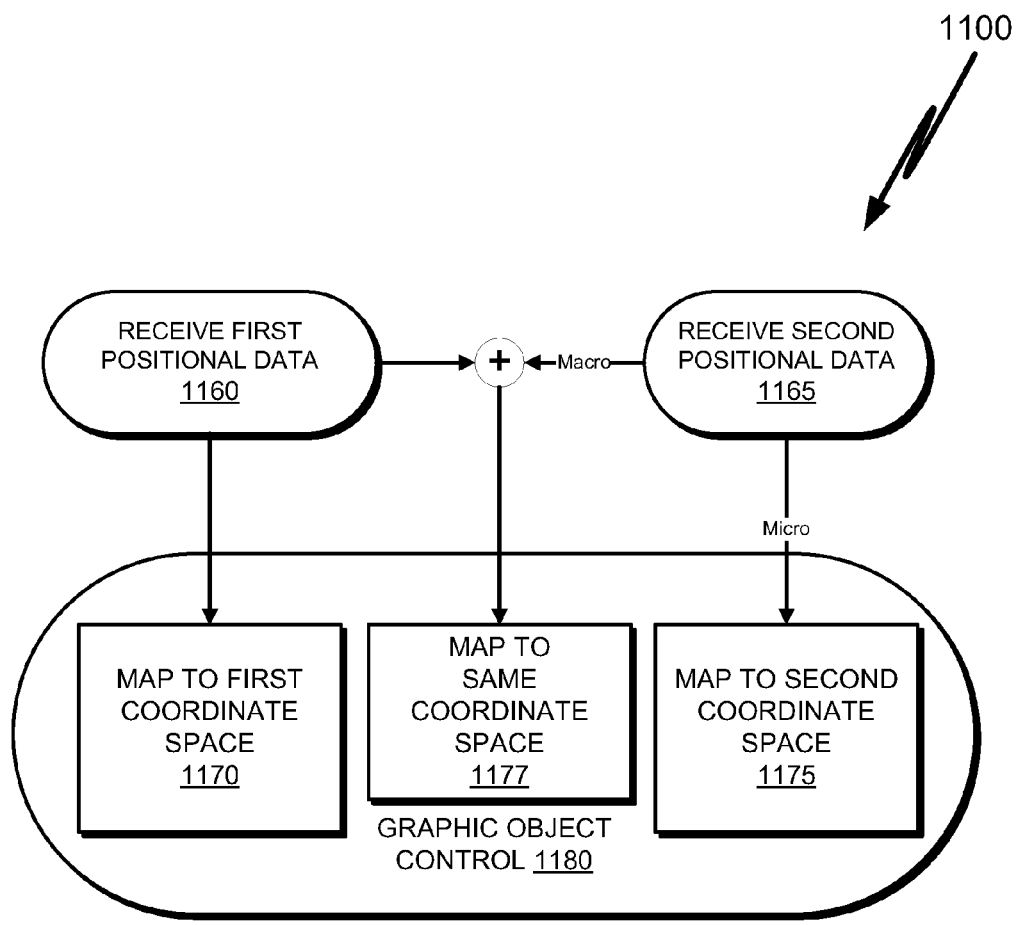
FIG. 11 is a flow diagram illustrating a method of controlling a graphic object based on first and second positional information received from a control stick incorporating a sensor array, in accordance with embodiments of the present invention.

FIG. 11 is a flow diagram illustrating a method 1100 of controlling a graphic object based on first and second positional information received from a control stick incorporating a sensor array, in accordance with embodiments of the present invention. At operations 1160 and 1165, first and second positional information is received from the respective sources, as described elsewhere herein. In a first embodiment, first positional information $(X_1, Y_1)$ is mapped to a first coordinate space at operation 1170. For example, first positional information $(X_1, Y_1)$ may be mapped to a camera view space in a graphics engine of a 3D gaming application, such as a first person shooter (FPS) application. Control of the camera view space as a graphic object at operation 1180 is then based, at least in part, on the first positional information. In the first embodiment, second positional information $(X_2, Y_2)$ is mapped to a second coordinate space at operation 1175. For example, second positional information $(X_2, Y_2)$ may be mapped to a target space in the graphics engine of the same 3D gaming application. Control of the aiming (e.g., crosshair) as a graphic object at operation 1180 within a viewing frustum of the camera view space is then based, at least in part, on the second positional information. In this manner, the second positional information may be utilized for "control hat" capability based on a single thumb's motion. As another example, a swipe across the top of the thumb stick may trigger a computing platform to execute a command defined in a command coordinate space, for example second positional data may be mapped to a menu pull down, a screen change, an avatar change, or configuration of any other non-spatial attribute of a graphics object rendered by the graphics engine.

In an alternative embodiment, the second positional data received at operation 1165 is combined with the first positional data received at operation 1160 and mapped to a same coordinate space at operation 1180. For example, both first positional information ($X_1, Y_1$) and second positional information ($X_2, Y_2$) may be mapped to a camera view space in a graphics engine of a 3D gaming application, but to different effect. In one such embodiment, the second positional information may perform a "mouselook" to rotate the camera view space while the first positional information is used to modify the camera view space to simulate running. In another embodiment, both first positional information ($X_1, Y_1$) and second positional information ($X_2, Y_2$) may be mapped to a same coordinate space (e.g., a camera view space) with both the first and second positional information having the same function. For example, second positional data may be input into a comb filter to improve signal to noise ratio (SNR) for the first positional data and thereby further improve sensitivity of the control stick. As another example, second positional data generated from minute changes in thumb pressure levels may be mapped a same coordinate space (e.g., a camera view space) to provide a non-linear positional input into a computing platform with displacement relative to the control stick registered by the embedded sensor array mapped to the coordinate space with a first scale factor and displacement of a control stick relative to a controller body registered by the potentiometers mapped to the coordinate space (e.g., a camera view space) with a second (smaller) scale factor.

Figure 12:
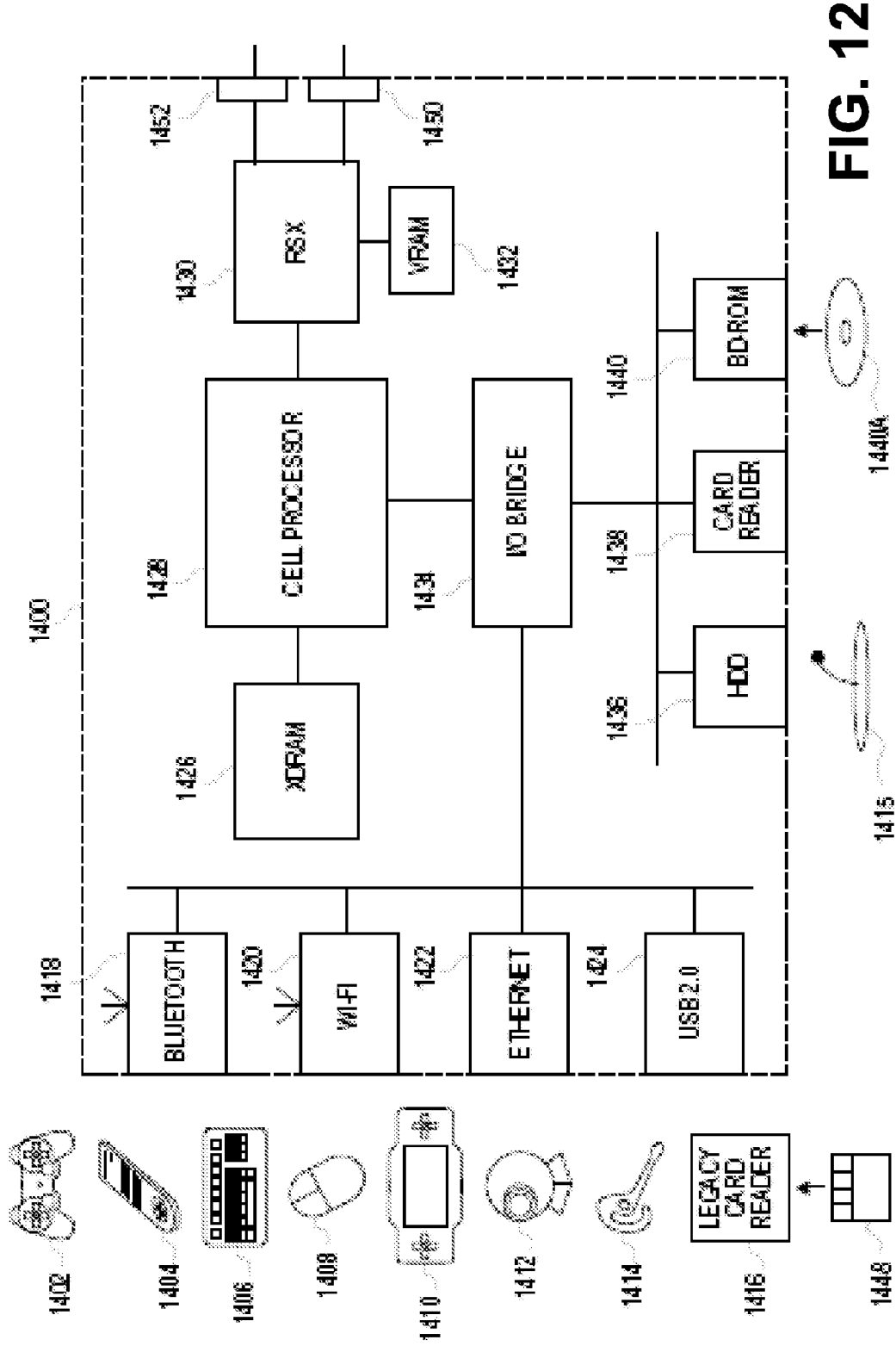
FIG. 12 illustrates hardware and user interfaces that may be used to determine object positional information, in accordance with one embodiment of the present invention.

FIG. 12 further illustrates hardware and user interfaces that may be used to adapt a display based on object tracking, in accordance with one embodiment of the present invention. FIG. 12 schematically illustrates the overall system architecture of the Sony® Playstation® 3 entertainment device, a console that may be compatible for implementing the object tracking methods described herein. A platform unit 1400 is provided, with various peripheral devices connectable to the platform unit 1400. The platform unit 1400 comprises: a Cell processor 1428; a Rambus® dynamic random access memory (XDRAM) unit 1426; a Reality Simulator graphics unit 1430 with a dedicated video random access memory (VRAM) unit 1432; and an I/O bridge 1434. The platform unit 1400 also comprises a Blu Ray® Disk BD-ROM® optical disk reader 1440 for reading from a disk 1440A and a removable slot-in hard disk drive (HDD) 1436, accessible through the I/O bridge 1434. Optionally the platform unit 1400 also comprises a memory card reader 1438 for reading compact flash memory cards, Memory Stick® memory cards and the like, which is similarly accessible through the I/O bridge 1434.

The I/O bridge 1434 also connects to multiple Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controller 1402, having the control stick functionality described herein. For example when a user is playing a game, the I/O bridge 1434 receives data from the game (motion) controller 1402 via a Bluetooth link and directs it to the Cell processor 1428, which updates the current state of the game accordingly.

The wireless, USB and Ethernet ports also provide connectivity for other peripheral devices in addition to game controller 1402, such as: a remote control 1404; a keyboard 1406; a mouse 1408; a portable entertainment device 1410 such as a Sony Playstation® Portable entertainment device; a video image sensor such as an Playstation® Eye video image sensor 1412; a microphone headset 1414; a microphone array 1415. Such peripheral devices may therefore in principle be connected to the platform unit 1400 wirelessly; for example the portable entertainment device 1410 may communicate via a Wi-Fi ad-hoc connection, while the microphone headset 1414 may communicate via a Bluetooth link.

The provision of these interfaces means that the Playstation 3 device is also potentially compatible with other peripheral devices such as digital video recorders (DVRs), set-top boxes, digital video image sensors, portable media players, Voice over IP telephones, mobile telephones, printers and scanners.

The game controller 1402 is operable to communicate wirelessly with the platform unit 1400 via the Bluetooth link, or to be connected to a USB port, thereby also providing power by which to charge the battery of the game controller 1402. Game controller 1402 can also include memory, a processor, a memory card reader, permanent memory such as flash memory, light emitters such as LEDs or infrared lights, microphone and speaker, a digital video image sensor, a sectored photodiode, an internal clock, a recognizable/identifiable shape such as a spherical section facing the game console.

The game controller 1402 is configured for inputs to a game as described herein in addition to, or instead of, conventional button or control stick commands known in the art. Optionally, other wirelessly enabled peripheral devices such as the Playstation™ Portable device may be used as a controller with the control stick functionality described herein. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or the like.

The remote control 1404 is also operable to communicate wirelessly with the platform unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The platform unit 1400 is operable to supply audio and video, either generated or decoded by the Playstation 3 device via the Reality Simulator graphics unit 1430, through audio and video connectors to a display and sound output device. The audio connectors 1450 may include conventional analogue and digital outputs while the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

In one embodiment, the video image sensor 1412 comprises a single charge coupled device (CCD) and an LED indicator. In some embodiments, the image sensor 1412 includes software and hardware-based real-time data compression and encoding apparatus so that compressed video data may be transmitted in an appropriate format such as an intra-image based MPEG (motion picture expert group) standard for decoding by the platform unit 1400. The video image sensor LED indicator is arranged to illuminate in response to appropriate control data from the platform unit 1400, for example to signify adverse lighting conditions. Embodiments of the video image sensor 1412 may variously connect to the platform unit 1400 via an HDMI, USB, Bluetooth or Wi-Fi communication port. Embodiments of the video image sensor may include one or more associated microphones and may also be capable of transmitting audio data. In embodiments of the video image sensor, the CCD may have a resolution suitable for high-definition video capture. In use, images captured by the video image sensor may for example be incorporated within a game or interpreted as game control inputs. In another embodiment the video image sensor is an infrared video image sensor suitable for detecting infrared light.

Figure 13:
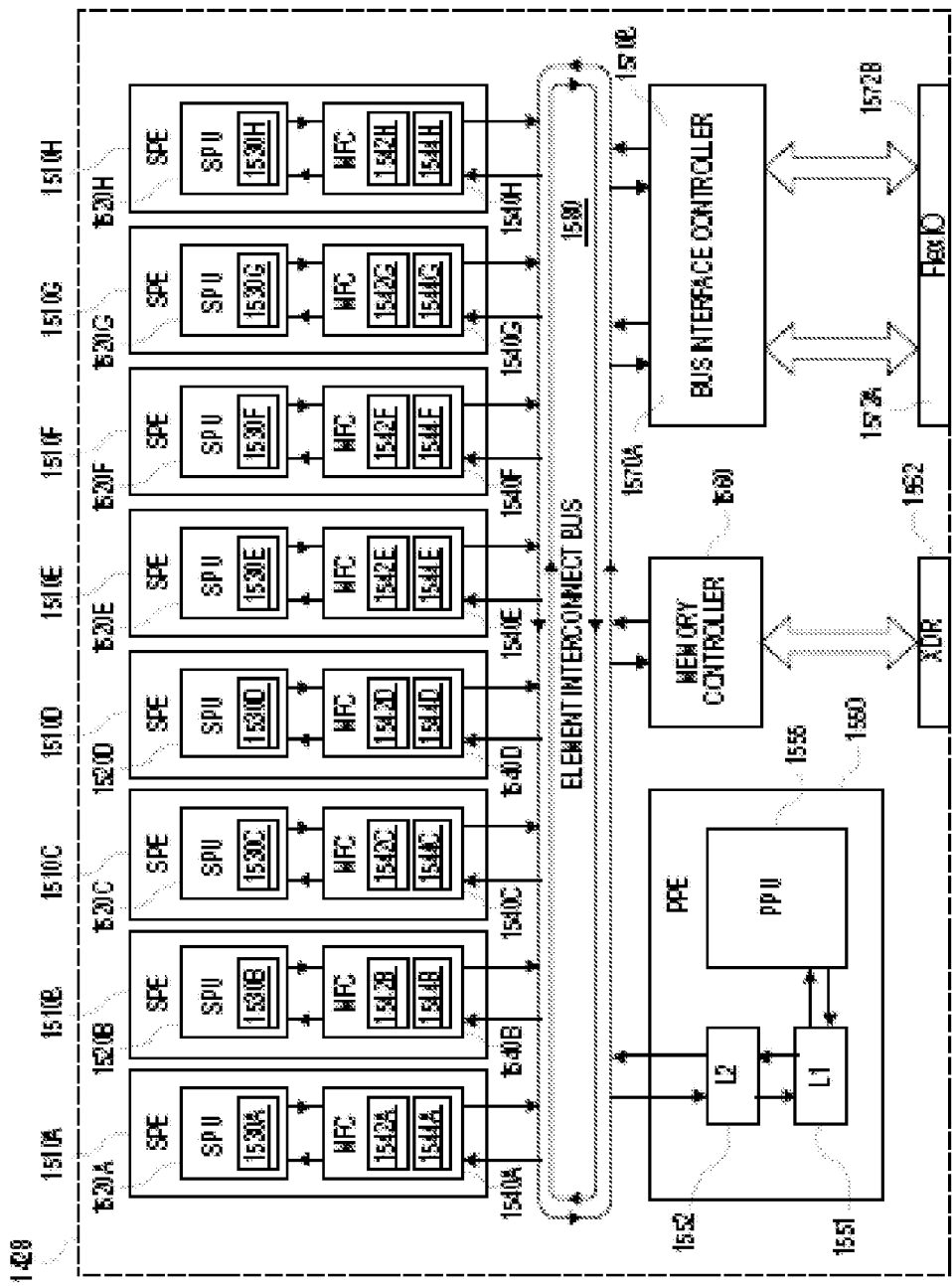
FIG. 13 illustrates additional hardware that may be used to process instructions, in accordance with one embodiment of the present invention.

FIG. 13 illustrates additional hardware that may be used to process instructions, in accordance with one embodiment of the present invention. Cell processor 1428 of FIG. 12, as further illustrated in FIG. 13, has an architecture comprising four basic components: external input and output structures comprising a memory controller 2160 and a dual bus interface controller 2170A, B; a main processor referred to as the Power Processing Element 2150; eight co-processors referred to as Synergistic Processing Elements (SPEs) 2110A-H; and a circular data bus connecting the above components referred to as the Element Interconnect Bus 2180.

The Power Processing Element (PPE) 2150 is based upon a two-way simultaneous multithreading Power 1470 compliant PowerPC core (PPU) 2155 running with an internal clock of 3.2 GHz. It comprises a 512 kB level 2 (L2) cache 2152 and a 32 kB level 1 (L1) cache 2151. The PPE 2150 is capable of eight single position operations per clock cycle, translating to 25.6 GFLOPs at 3.2 GHz. The primary role of the PPE 2150 is to act as a controller for the SPEs 2110A-H, which handle most of the computational workload. In operation the PPE 2150 maintains a job queue, scheduling jobs for the SPEs 2110A-H and monitoring their progress. Consequently each SPE 2110A-H runs a kernel whose role is to fetch a job, execute it and synchronized with the PPE 2150.

Each Synergistic Processing Element (SPE) 2110A-H comprises a respective Synergistic Processing Unit (SPU) 2114A-H, and a respective Memory Flow Controller (MFC) 2140A-H comprising in turn a respective Dynamic Memory Access Controller (DMAC) 2142A-H, a respective Memory Management Unit (MMU) 2144A-H and a bus interface (not shown). Each SPU 2114A-H is a RISC processor having local RAM 2130A-H.

The Element Interconnect Bus (EIB) 2180 is a logically circular communication bus internal to the Cell processor 1428 which connects the above processor elements, namely the PPE 2150, the memory controller 2160, the dual bus interface controller 1570A, B and the 8 SPEs 2110A-H, totaling 12 participants. Participants can simultaneously read and write to the bus at a rate of at least 8 bytes per clock cycle. As noted previously, each SPE 2110A-H comprises a DMAC 2142A-H for scheduling longer read or write sequences. The EIB comprises four channels, two each in clockwise and anti-clockwise directions. Consequently for twelve participants, the longest step-wise data-flow between any two participants is six steps in the appropriate direction.

The memory controller 2160 comprises an XDRAM interface 2126 through which the memory controller interfaces with XDRAM. The dual bus interface controller 2170A, B comprises a system interface 2172A,B.

It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. An electronic device, comprising:
   first circuitry to receive first positional information associated with physical displacement of a control stick in at least a first and second dimension relative to a reference position;
   second circuitry to automatically sense whether an object is in proximity to, or in contact with, the control stick and to generate a corresponding presence detect signal; and
   logic to automatically calibrate the reference position for the control stick in response to the presence detect signal indicating no object is in proximity to, or in contact with, the control stick.

2. The electronic device of claim 1, wherein the logic to automatically calibrate the reference position is to correlate a mechanical position of the control stick to a positional center point in a logical coordinate space.

3. The electronic device of claim 1, further comprising:
   the control stick;
   a first sensor coupled to the control stick to detect the physical displacement of the control stick and to generate the corresponding first positional information; and
   a second sensor to detect a presence of an object in contact with, or in proximity to, the control stick, and to generate the corresponding presence detect signal.

4. The electronic device of claim 3, wherein the second sensor comprises a tactile sensor disposed in the control stick, the tactile sensor to detect a capacitance, a resistance, or a force applied at an exterior surface of the control stick.

5. The electronic device of claim 4, wherein the tactile sensor comprises at least one of a piezoresistive, piezoelectric, resistive, capacitive, optical, or elastoresistive touch sensor.

6. A controller for control of a displayed graphic, the controller comprising:
   a body;
   a control stick protruding from the body;
   a first sensor coupled to the control stick to detect a displacement of the stick in at least a first and second dimension relative to the body and to output corresponding first positional information;
   a proximity sensor to detect an object within a threshold distance of an exterior surface of the control stick before the object contacts the exterior surface, and output a corresponding presence detect signal; and
   logic to map a reference position to a mechanical position of the control stick in response to the output from the proximity sensor.

7. The controller of claim 6, wherein the proximity sensor further comprises a projected capacitive sensor, thermal sensor, photodetector, or ultrasonic transceiver disposed in the control stick or the controller body.

8. The controller of claim 6, wherein the logic to map the reference position further comprises logic to initiate calibration of the reference position in response to detecting an object in proximity to the control stick.

9. A controller for control of a displayed graphics object, the controller comprising:
   a body;
   a control stick protruding from the body;
   a first sensor coupled to the control stick to detect a displacement of the stick in at least a first and second dimension relative to the body and to output corresponding first positional information;
   a tactile sensor to detect capacitance or a force applied to an exterior surface of the control stick, and to output a corresponding presence detect signal; and
   logic to map a reference position to a mechanical position of the control stick in response to the output from the tactile sensor.

10. The controller of claim 9, wherein the tactile sensor is disposed in the control stick, to detect a pressure applied to a surface of the control stick, and, in response, output the corresponding presence detect signal.

11. The electronic device of claim 3, wherein the second sensor comprises a proximity sensor disposed in the controller, the proximity sensor to detect an object within a threshold distance from a surface of the control stick.

12. The electronic device of claim 11, wherein the proximity sensor further comprises a thermal sensor, photodetector, or ultrasonic transceiver disposed in the control stick.

13. The electronic device of claim 3, wherein the second sensor further comprises a sensor array having a plurality of sensing elements along at least a first dimension, the sensor array further to generate second positional information.

14. The controller of claim 13, wherein the sensor array has a plurality of sensing elements along at least a second dimension to form a two dimensional array.

15. The controller of claim 14, wherein the sensor array is disposed on a top surface of the control stick.

16. The electronic device of claim 13, further comprising:
   a computing platform with a graphics engine to generate graphic objects based on the first positional information in response to the presence detect signal indicating an object is in proximity to, or in contact with, the control stick.

* * * * *